United States Patent [19]

Gallup et al.

[11] Patent Number: 5,730,882

[45] Date of Patent: Mar. 24, 1998

[54] METHOD FOR REMEDIATION OF WATER CONTAINING EMULSIFIED OILS

[75] Inventors: Darrell L. Gallup, Chino Hills; Danilo M. Capampangan, Diamond Bar, both of Calif.

[73] Assignee: Union Oil Company of California, El Segundo, Calif.

[21] Appl. No.: 412,823

[22] Filed: Mar. 29, 1995

[51] Int. Cl.$^6$ .................................. C02F 1/56; C02F 1/28
[52] U.S. Cl. ...................... 210/708; 210/734; 210/694; 210/660; 210/667; 210/669
[58] Field of Search ................................. 210/708, 734, 210/738, 692, 693, 694, 666, 667, 669

[56] References Cited

U.S. PATENT DOCUMENTS

| | | | |
|---|---|---|---|
| 3,956,117 | 5/1976 | Bradley et al. | 210/708 |
| 4,137,162 | 1/1979 | Mohri et al. | 210/40 |
| 4,160,742 | 7/1979 | Raman | 210/708 |
| 4,179,369 | 12/1979 | Bradley et al. | 210/708 |
| 4,182,689 | 1/1980 | Presley et al. | 252/330 |
| 4,184,949 | 1/1980 | Sader | 210/708 |
| 4,198,294 | 4/1980 | Deane | 210/708 |
| 4,238,330 | 12/1980 | Fong et al. | 210/708 |
| 4,382,852 | 5/1983 | McCoy et al. | 208/188 |
| 4,765,908 | 8/1988 | Monick et al. | 210/666 |
| 4,839,054 | 6/1989 | Ruebush et al. | 210/708 |
| 5,037,927 | 8/1991 | Itagaki et al. | 526/307.7 |
| 5,185,083 | 2/1993 | Smigo et al. | 210/735 |

OTHER PUBLICATIONS

Luthy et al., Environmental Science & Technology, "*Surface Properties of Petroleum Refinery Waste Oil Emulsions,*" vol. 11, No. 13, Dec. 1977, pp. 1211–1217.

Cytec Industries, Inc., *Magnifloc* 1902N, West Paterson, New Jersey.

Cytec Industries, Inc., *Magnifloc* 836A, West Paterson, New Jersey.

Cytec Industries, Inc., *Magnifloc* 494C, West Paterson, New Jersey.

*Primary Examiner*—Neil McCarthy
*Attorney, Agent, or Firm*—Gregory F. Wirabicki; Alan H. Thompson; John A. Kane

[57] ABSTRACT

Emulsified oil contained in oil-in-water emulsions is removed from waste water by mixing cationic polyacrylamide high polymers with the waste water, forming oil-containing aggregations and separating the aggregations from the demulsified water. The demulsified water can then be more effectively polished, typically by contact with adsorbent particles, and subsequently passed to environmentally acceptable disposal locations.

65 Claims, No Drawings

METHOD FOR REMEDIATION OF WATER CONTAINING EMULSIFIED OILS

BACKGROUND OF THE INVENTION

1. Field of the Invention

This invention relates to methods of removing unwanted impurities from water. In particular, this invention relates to methods of removing unwanted hydrocarbons from water, especially emulsified oils and greases.

2. State of the Art

Oilfield-produced waters, remediation site waters, contaminated ground waters and refinery runoff streams all may contain high concentrations of hydrocarbons. These petroleum-containing waste waters can contain particularly high concentrations of several classes of organic compounds due to the high water solubility of such compounds. One such class of relatively highly water soluble hydrocarbons is the low molecular weight monocyclic aromatic hydrocarbons, (and some other structurally related non-hydrocarbon monocyclic aromatic compounds,) for example, benzene, toluene, ethylbenzene, and the three isomers of xylene, i.e., orthoxylene, metaxylene and paraxylene, (a mixture of at least three of the above named components dissolved in waste water will hereinafter be referred to as BTEX). Other commonly dissolved contaminant hydrocarbons include styrene, thiophenes, and pyridine. Because of health concerns, regulators have reduced the maximum acceptable concentration of BTEX in water to very low concentrations, typically <5 ppmw. Consequently, producers of BTEX-contaminated water need to remove or greatly reduce the concentrations of all these polluting hydrocarbons in produced aqueous runoff streams.

In patent application U.S. Ser. No. 08/273,602, now U.S. Pat. No. 5,531,902 (the disclosure of which is incorporated by reference herein in its entirety), highly effective hydrophobic powdered adsorbents are used in an exchange (adsorption) zone in a countercurrent water remediation method to remove BTEX. The deactivated or spent adsorbents containing adsorbed BTEX are continuously regenerated and then recycled to the exchange zone. However, waste water streams, such as those treated in the above countercurrent method as well as in other methods, may also contain water-insoluble hydrocarbons, such as crude oils, greases, lube oils, heavy diesel ends, other oils, and the like. Such water-insolubles can also be removed from the waste water stream by using adsorbent particles, such as the highly effective hydrophobic adsorbents in the countercurrent method. However, problems have arisen during regeneration of the spent adsorbents containing both BTEX and the water-insolubles. Thus, a need exists for an effective water remediation method when the waste water contains dissolved contaminant hydrocarbons usually including BTEX, and water-insoluble oils and greases.

In my co-pending patent application Ser. No. 08/229,692 (the disclosure of which is incorporated by reference herein in its entirety), a substantial proportion of non-emulsified, water-insoluble contaminant hydrocarbons are removed from waste water streams prior to passing the streams through adsorbent particle beds to remove BTEX and other contaminants. The non-emulsified, water-insoluble contaminant hydrocarbons have been initially separated from the waste water by mechanical means such as a liquid-liquid coalescer or a hydrocyclone. However, problems of separation have arisen when the water-insoluble hydrocarbon droplets are too small, such as when emulsified, water-insoluble contaminant hydrocarbons are present in the waste water. Such contaminated streams contain emulsified oils in what are commonly called "oil-in-water" emulsions. Ordinary mechanical separation means have been relatively unsuccessful in "breaking" such emulsions. Furthermore, such oil-in-water emulsions may also be present in waste water streams containing insoluble solids, such as earth fragments, clay-like sediments, and the like. The presence of the solids further complicates the separation problem. Thus, a need exists for an effective water remediation method when oil-in-water emulsions are present in waste waters or otherwise impure or unsuitable waters.

SUMMARY OF THE INVENTION

Briefly, the invention relates to a method for removing emulsified oil from waste water or other impure waters. Usually an oil-in-water emulsion is contacted or mixed with a high polymer composition comprising at least one cationic polyacrylamide component to form an aggregation (e.g., flocculation or coagulation) of oil-containing clusters that can be mechanically separated from the remaining demulsified water. The method is not dependent upon the pH of the waste water; however, in some instances, aluminum sulfate (i.e., Alum) can also be mixed with the waste water.

The invention also relates to a two-stage, non-biological method for first removing the emulsified oils and then removing dissolved contaminant hydrocarbons from the waste water stream. In the first stage, a substantial proportion of the emulsified oils is removed from the waste water stream utilizing the cationic polyacrylamide high polymer composition and separation techniques. The second stage involves contacting the remaining waste water stream containing a mixture of dissolved contaminant hydrocarbons and/or BTEX, with either a stationary (i.e., fixed) or moving bed of adsorbent particles in an exchange (adsorption) zone. Because a large proportion of oils is removed in the first stage, the accumulation of the oils, greases, and the like, onto adsorbent particles is substantially reduced or essentially prevented. Thus, the two-stage embodiment of the invention allows the adsorbents to effectively adsorb the dissolved contaminant hydrocarbons and still be readily regenerated to substantially full capacity.

By employing the cationic polyacrylamides, the unwanted hydrocarbon components of emulsified oils, including diesel fuel and gasoline as well as water-insoluble oils and greases, may be removed from petroleum-contaminated waters such as oil field contaminated groundwater, and oil field-produced and refinery-produced water waste streams by skimming or settling separation techniques and, if necessary, followed by adsorption or other hydrocarbon-removing techniques. The two-stage method has the advantage of protecting highly effective BTEX-removing adsorbents from poisoning by oils and greases contained in the waste water streams remediated in the invention.

DETAILED DESCRIPTION OF THE INVENTION

The method of the invention is primarily useful for reducing the concentration of petroleum-derived, water-insoluble hydrocarbon contaminants contained in waste waters found in such locations as field storage tanks and/or ponds, natural water-containing bodies (e.g., lagoons, etc.), oil field contaminated groundwater, oil field-produced water, refinery-produced water, water produced at soil (or other) remediation sites, and various other waste waters whose mineral oils are detected.

The waste water treated by the invention contains emulsified water-insoluble hydrocarbon contaminants, i.e., emulsified oils contained in oil-in-water emulsions. However, the waste water can contain both emulsified and non-emulsified, water-insoluble hydrocarbon contaminants as well as dissolved contaminant hydrocarbons. The water-insoluble hydrocarbon contaminants contained in the waste water usually include crude oils, greases, diesel fractions wherein at least 90 volume percent of the components boiling in the range from 350° F. to 700° F., naphthas, lube oils, residuum fractions, tars, other oils, and the like. Such water-insolubles are usually derived from mineral oils such as petroleum and referred herein generally as "oils". Such oils are emulsified in the waste water in an oil-in-water emulsion and referred to herein as "emulsified oils". The emulsified oils are usually comprised of molecules having at least 9 carbon atoms (i.e., $C_{9+}$-containing molecules), and normally comprised of at least $C_{12+}$-molecules. The soluble or dissolved hydrocarbon contaminants typically contain $C_{12+}$-molecules, and usually contain $C_{9-}$-molecules, e.g., BTEX, styrene, thiophene, pyridine, alkanes, alkenes and alkynes. Furthermore, the emulsified oils normally contain oil particles (droplets) of average particle size less than about 20 microns, preferably less than 10 microns, and more preferably less than about 5 microns (as determined by such conventional means as a Coulter Counter or a particle size analyzer). Moreover, the turbidity of the waste water is normally greater than 5 Formazin Turbidity Units (FTU), and often greater than 10 or 20 FTU.

Typically, the waste water contains more than 1 ppmw of total water-insoluble hydrocarbon contaminants (i.e., emulsified and non-emulsified oils) and frequently contains suspended inorganic solids. The waste water feedstream usually contains about 1 to about 500 ppmw of total water insoluble hydrocarbons (i.e., emulsified and non-emulsified oils) which are reduced to a concentration less than about 40 ppmw, and preferably less than 15 ppmw of total water-insolubles in the treated product waste water, i.e., demulsified water. Preferably, the waste water initially treated with the high polymer composition contains about 10 to about 250 ppmw, and most preferably about 25 to about 100 ppmw of emulsified oil. It is preferred that the emulsified oil be reduced to less than 10 ppmw in the demulsified water. It is highly preferred that the total emulsified oils be reduced to a concentration less than 5 ppmw in the demulsified water. Normally at least 50, preferably at least 70, more preferably at least 80, and most preferably at least 90 weight percent of the total emulsified oils are removed from the waste water as a result of separation of an oil-containing aggregation from the demulsified water. Furthermore, the turbidity of the waste water is usually reduced to less than 20, preferably less than 10, and most preferably less than 5 FTU, in the demulsified water.

The waste water is contacted with a high polymer composition to form an aggregation of oil-containing clusters that are subsequently separated from the remaining water (demulsified water). The contacting and aggregation formation can occur at temperatures from above the freezing temperature of the waste water to about 160° F. The high polymer composition contains a cationic polyacrylamide compound that usually has a molecular weight of at least 20,000, but preferably greater than about 1,000,000. A preferred cationic polyacrylamide component of the high polymer composition has the following structure:

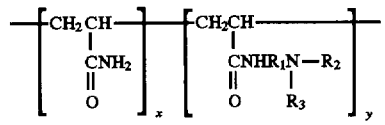

wherein $R_1$ is $(CH_2)_{1-20}$; $R_2$ and $R_3$ are independently selected from the group consisting of $CH_3$, $(CH_2)_{1-20}$—$CH_3$, phenyl or substituted phenyl groups; and at least one $(CH_2)$ group in said $(CH_2)_{1-20}$ group and said

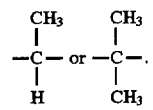

$(CH_2)_{1-20}$—$CH_3$ group can be replaced by

A highly preferred high polymer composition contains cationic polyacrylamide compounds found in Magnifloc 494C flocculent and/or Magnifloc 1594 flocculent, each being available from CYTEC INDUSTRIES, West Paterson, N.J.

The waste water is usually contacted and/or mixed with the high polymer composition by methods such as adding solid or liquid compositions of the high polymer to the waste water in a suitable dosage. Normally the high polymer composition is mixed with the waste water so as to effect a concentration of cationic polyacrylamide component from about 0.25 to about 20 ppmw of the waste water. Preferably, the waste water contains about 0.5 to about 10 ppmw, and most preferably about 1 to about 5 ppmw of the added cationic polyacrylamide compound. In some applications, a source of aluminum sulfate, i.e., Alum, can also be added to the waste water, typically in a concentration of about 1 to about 250 ppmw, but usually from 5 to 200 ppmw, and preferably from 10 to 100 ppmw of the waste water. Usually Alum and the high polymer composition are contained in the waste water in a weight ratio from about 500:1 to about 1:0.25, Alum to cationic polyacrylamide. However, in several effective embodiments of the invention, the waste water is contacted with the high polymer composition in the absence of Alum.

The high polymer composition (and optionally, Alum) and waste water are usually agitated by mixing means such as a static mixer, impeller mixer, paddle mixer, and modifications thereof. The aggregation can be formed essentially spontaneously with the contacting of the high polymer composition and waste water; however, in some instances the aggregation can form within 1 minute, or up to 10 minutes, and sometimes up to 30 minutes, before having the capability of being separated. The relatively short residence time permits construction of a relatively small container or vessel for mixing, aggregating, and separating, prior to further treatment of the demulsified water.

The aggregation of oil-containing clusters can be separated from the product waste water (i.e., demulsified water) by one or more of several separation means. Generally the separation method and/or means is determined by the nature of the aggregation that is formed. In one embodiment, the aggregation is a flocculation that is not capable of being separated from the water by settling or by ordinary settling-type means. The flocculation typically "floats" to the upper surface of the product waste water and is separated by means such as a skimmer, an API separator, a mechanical coalescer, a Dissolved Air Flotation (DAF) apparatus, a filter, a membrane, a hydrocyclone and modifications thereof. In a second embodiment, the aggregation is a coagulation that is capable of being separated from the water as a result of its settling to a lower portion of the water container or by ordinary settling-type means. The coagulation contains the oil-containing clusters as well as inorganic solids and/or semisolids that are often contained (suspended) in the initial waste water. The oil-containing clusters and the inorganic solids in the coagulation adhere to each other and can naturally settle to the lower portion of the mixing containers and/or can be separated from the product waste water by settling means such as a clarifier, a thickener, a settling tank, a pond, a lagoon, and modifications thereof.

Suspended inorganic solids contained in the waste water are also removed from the waste water by settling the solids (and/or semisolids) from the water in the presence of the high polymer composition and simultaneously with removal of at least some of the emulsified oils. The high polymer composition is added to the waste water to initially form the aggregation (coagulation) having the oil-containing clusters that adhere to the inorganic solids. Oil-containing clusters having emulsified oils, such as mineral oils and gasoline, jet, turbine, and particularly diesel fuels, are surprisingly attracted to such inorganic solids as earth fragments, clay-like solids, silt particles, sand particles, iron-containing particles, and the like, and appear to adhere more effectively in the absence of Alum. The resultant solid/oil cluster coagulation can then be settled, precipitated and/or filtered or otherwise separated from the demulsified water.

After separation from the aggregation, the demulsified water streams can be passed to disposal sites, such as a sewage treatment processing unit, a percolation pond, a waste water treating unit, an ocean or other approved natural body of water, and an injection well, or used in make-up water for industrial processes. However, only a minor amount (sometimes none) of the dissolved contaminant hydrocarbons is normally removed from the waste water after addition of the high polymer composition, aggregation and separation, and therefore the product (demulsified) waste water stream normally contains a concentration of the dissolved contaminant hydrocarbons that can still concern environmental regulators.

In patent application U.S. Ser. No. 08/273,602, now U.S. Pat. No. 5,531,902 the particulate polymeric resinous adsorbents, such as Ambersorb 572 and 563, are highly effective for adsorbing dissolved contaminant hydrocarbons from waste water streams. Other particulate adsorbents such as granular activated carbon (GAC), mixtures of clays and GAC, powdered activated (PAC), organic modified clays or zeolites, and other conventional adsorbents, are also effective for such use. After sufficient contact with the waste water in the adsorption or exchange zone, the adsorbents become at least partially deactivated, i.e., lose a portion of their adsorption capacity, and must be regenerated to a condition for again removing dissolved contaminant hydrocarbons from water. However, when the waste water stream also contains water-insoluble hydrocarbons that contact such adsorbents in the exchange zone, the adsorbents become poisoned and cannot be readily regenerated to original or fresh capacity. Thus, a substantial proportion of the water-insoluble hydrocarbons must be removed from the waste water stream (with the aid of the cationic polyacrylamide) in the first stage of a two-stage method so the highly effective adsorbents in the second stage exchange zone can be (1) protected from poisoning and (2) regenerated to suitable freshness.

Both the waste water stream fed to the first stage and demulsified water fed to the second stage of the two-stage embodiments of the invention contain more than 1, and usually more than 10 ppmw, of total dissolved contaminant hydrocarbons, such as BTEX. A typical concentration of total dissolved contaminant hydrocarbons and/or BTEX in the waste water stream fed to either the first or second stage is about 1 to about 400 ppmw; however, a waste water stream containing a range from 10 to 400 ppmw is treated most often. The effluent water stream, i.e., a "polished" water stream, obtained from the second stage of the two-stage method, usually contains total dissolved contaminant hydrocarbons, and particularly total BTEX and/or total diesel and/or total gasoline, in a concentration less than 1 ppmw, and preferably less than 0.05 ppmw.

After separation of the aggregation of oil-containing clusters derived from the oil-in-water emulsion, any conventional fixed bed or countercurrent unit can be adapted for use in removing a significant or substantial proportion of dissolved hydrocarbon components from demulsified waste water streams. Fixed or stationary beds of adsorbents may be utilized. In the invention, fixed bed systems are ordinarily useful for processing waste water streams at rates less than 200–250 gallons per minute; however, when rates exceed about 200, and usually exceed 250 gallons per minute, countercurrent units are normally more effective.

Although fixed bed units may be employed, countercurrent units are preferred in the second stage of the two-stage method. Manufacturers currently market several "countercurrent" loops. An example showing the details of one is disclosed in my co-pending patent applications Ser. Nos. 08/273,602 and 08/229,692. Two critical details of the two-stage embodiment are a) that the adsorbent remove a substantial amount, preferably at least 75%, of the dissolved contaminating hydrocarbon from the waste water stream, and b) that the method of regeneration remove substantially all the contaminants from the adsorbent particles. In the preferred countercurrent embodiment, the adsorbent particles must circulate through both the exchange and regeneration zones rather than occupy a fixed (stationary) bed.

The polished water stream can be passed to those sites, or used in the same processes, that the demulsified waters are passed or utilized. A preferred effluent water stream from the second stage of the two-stage method contains sufficiently low concentrations of both water-insolubles and dissolved contaminant hydrocarbons to pass standards for being further treatable in a municipal sewage treatment facility and, preferably, to pass animal consumption water standards.

The invention is further illustrated by the following examples which are illustrative of specific modes of practicing the invention and are not intended as limiting the scope of the invention in any manner as defined by the appended claims.

EXAMPLE I

A 1 weight percent solution of a cationic flocculent, Magnifloc 494C, containing a high polymer of cationic polyacrylamide (available from CYTEC INDUSTRIES, West Paterson, N.J.), is added to and stir mixed with sufficient amounts of the CNU waste water to produce a 2.5 ppmw concentration of the flocculent in the waste water. The waste water used was obtained from a crude oil production field in Coalinga, Calif., i.e., the Coalinga Nose Unit (CNU), and contains approximately 35 ppmw of emulsified oil in an oil-in-water emulsion. Within 30 seconds after the mixing, a flocculation containing the emulsified oil floats to the surface of the water. The flocculation is then skimmed from the water surface with an API separator and the resultant demulsified water analyzed for emulsified oil content. The concentration of oil in the emulsified form is surprisingly less than 1 ppmw of the demulsified water (as determined by the method of EPA test 418.1). Such demulsified water can be further treated with adsorbent particles to remove dissolved hydrocarbon contaminants, without pre-mature poisoning of the adsorbent particles by the oil.

In a similar manner, an anionic flocculent, Magnifloc 25, a high polymer anionic polyacrylamide (available from CYTEC), is added to the CNU water in the same concentration as Magnifloc 494C. However, no flocculation is formed, and no emulsified oil is removed from the CNU water.

In a third test, similar to above, aluminum sulfate (Alum) is added to the CNU waste water to produce a 150 ppmw concentration of Alum in the waste water. Shortly after Alum addition, a fine "floating" precipitate solid is formed that does not settle. However, Magnifloc 494C is then added (in a concentration of 2.5 ppmw of the waste water) and the resultant solid surprisingly settles, and is separated from the demulsified water. Oil is detected in the resultant solid and, surprisingly, essentially no oil is detected in the demulsified water. It is apparent that essentially all the oil previously contained in the emulsified form in the CNU waste water has adhered to the settling solid coagulation of cationic polyacrylamide/oil clusters, and Alum or Alum derivatives.

In a fourth test, similar to above, the Alum is added to the CNU waste water to again produce the fine floating precipitate solid. Anionic flocculent Magnifloc 25 is then added (as above) and an aggregation of the solid and flocculent continues to float rather than settle. The aggregation is separated from the water by skimming. The concentration of oil in the water is essentially the same as that in the CNU waste water.

EXAMPLE II

Petroleum-contaminated water produced from a remediation process in San Diego, Calif., is collected and allowed to stand for 5 minutes in separation pots. The Separated waste water contains emulsified oil, i.e., a total petroleum hydrocarbon (TPH) content of approximately 87 mg/l (as determined by EPA test method 418.1), including a diesel content of 38 mg/l (as determined by EPA test method 8015 modified for diesel). The separated waste water contains suspended clay-like, inorganic solids and has a turbidity of 225 FTU (as measured with a Hach DR2 field spectrophotometer).

Four equivalent samples of the separated waste water are treated separately in a settling tank with compositions containing cationic polyacrylamide, (i.e., solution of Magnifloc 1594 or powdered Magnifloc 494C available from CYTEC) and/or aluminum sulfate (Alum). Such compositions are added to the water and stir mixed. The cationic polyacrylamide and Alum concentrations in the separated waste water are 1.5 ppmw and 25 ppmw, respectively. Coagulations containing oil from the emulsified oil and the suspended clay-like inorganic solids are formed in each sample. The coagulations are settled to a sludge blanket in the bottom of the settling tank and removed for disposal while the supernatant water can optionally be passed from the tank through a filter containing granular activated carbon (GAC) adsorbent particles to further reduce the hydrocarbon content of the demulsified waste water.

The supernatant water is analyzed for turbidity as well as TPH and diesel content. The data are summarized in Table 1.

TABLE I

| Additive(s) | Turbidity, FTU | TPH, mg/l | Diesel, mg/l |
|---|---|---|---|
| None | 225 | 87 | 38 |
| Magnifloc 1594 | 85 | 9.5 | <1 |
| Alum | 50 | 17 | 6.7 |
| Magnifloc 1594/Alum | 20 | 2.4 | 5.3 |
| Magnifloc 494C | 20 | 2.4 | <1 |

The data in Table I indicate the turbidity and emulsified oil concentrations of the waste water can be substantially reduced with cationic polyacrylamide addition. However, it is unusual that the diesel concentration in the waste water is also essentially eliminated, i.e., reduced to less than 1 mg/l when the cationic polyacrylamide composition is mixed with the waste water in the absence of Alum. Thus, in the presence of the cationic polyacrylamide—and without the necessity of another aggregation-forming agent—the diesel components adhere to and settle with the clay-like inorganic solids.

EXAMPLE III

Waste water produced from a crude oil production field in Brea, Calif., contains emulsified oil in an oil-in-water emulsion. Approximately 38 ppmw of oil in the emulsified form is contained in such waste water.

Five equivalent samples of the waste water are treated separately with respective compositions containing (A) a high polymer of a cationic polyacrylamide, i.e., Magnifloc 494C, (B) a high polymer of an anionic polyacrylamide, i.e., Magnifloc 836A (available from CYTEC), (C) a high polymer of a nonionic polyacrylamide, i.e., Magnifloc 1906N (available from CYTEC), (D) aluminum sulfate, (i.e., Alum) and (E) Magnifloc 494C and Alum. Such compositions are added to the waste water and stir mixed in high polymer concentrations of approximately 2 ppmw and Alum concentrations of approximately 25 ppmw, relative to the waste water. Flocculations containing oil derived from the emulsified oil are formed in samples (A), (B), (C) and (E). Such flocculations float to the surface of the water and are then skimmed from the water in the same manner as in Example I. The resultant water is analyzed for emulsified oil content in the same manner as in Example I. The data are summarized in Table II.

TABLE II

| Additive | TPH, ppmw | Percent Reduction of Emulsified Oil |
|---|---|---|
| None | 38 | |
| (A) Magnifloc 494C | 9.7 | 75.5 |
| (B) Magnifloc 836A | 21 | 44.7 |
| (C) Magnifloc 1906N | 19 | 50 |
| (D) Alum | 38 | 0 |
| (E) Magnifloc 494c/Alum | 3.6 | 90.5 |

The data in Table II indicate that the cationic polyacrylamide surprisingly reduces the emulsified oil content in the waste water by greater than 60 weight percent, i.e., at least 75 weight percent with the addition of the cationic polyacrylamide alone, and at least 90 weight percent when Alum is also included.

What is claimed:

1. A method for removing oil-containing contaminants from waste water by demulsifying an oil-in-water emulsion, said method comprising the following steps:

(1) contacting said waste water containing an oil-in-water emulsion with a high polymer composition comprising a cationic polyacrylamide to form a coagulation of oil-containing clusters and at least a portion of demulsified water, where said coagulation is of a density greater than the density of the demulsified water, and (2) setting said coagulation from said demulsified water.

2. The method of claim 1 wherein said coagulation is separated from said demulsified water by settling means selected from the group consisting of a clarifier, a thickener, settling tank, pond, lagoon, and modifications thereof.

3. The method of claim 1 wherein said oil-in-water emulsion comprises a diesel fraction.

4. The method of claim 1 wherein said coagulation is settled to a lower portion of a container of said demulsified water.

5. The method of claim 1 wherein said waste water comprises about 10 to about 250 ppmw of said oil-containing contaminants.

6. The method of claim 1 wherein step (1) further comprises contacting said waste water with aluminum sulfate.

7. The method of claim 6 wherein said waste water comprises about 0.5 to about 10 ppmw of said cationic polyacrylamide.

8. The method of claim 6 wherein aluminum sulfate and said high polymer composition of cationic polyacrylamide are contained in said waste water in a weight ratio from about 500:1 to about 1:0.25, aluminum sulfate to high polymer composition.

9. The method of claim 1 wherein in step (1) said waste water is contacted with said high polymer composition in the absence of aluminum sulfate.

10. The method of claim 1 wherein said waste water is contained in field storage tanks, natural ponds or field storage ponds.

11. The method of claim 1 wherein step (1) further comprises agitating said oil-in-water emulsion with said high polymer composition by mixing means selected from the group consisting of static mixers, impeller mixers, paddle mixers, and modifications thereof.

12. The method of claim 1 wherein after step (1) said demulsified water is passed to a disposal site selected from the group consisting of a sewage treatment processing unit, a percolation pond, a waste water treating unit, an ocean, and an injection well.

13. The method of claim 1 wherein the turbidity of said waste water is greater than 5 Formazin Turbidity Units (FTU).

14. The method of claim 1 wherein the turbidity of said demulsified water is less than 20 FTU.

15. The method of claim 1 wherein said demulsified water contains less than 50 weight percent of said oil-containing contaminants contained in said waste water.

16. The method of claim 1 wherein said demulsified water contains less than 40 ppmw of said oil-containing contaminants.

17. The method of claim 1 wherein said cationic polyacrylamide comprises the following structure:

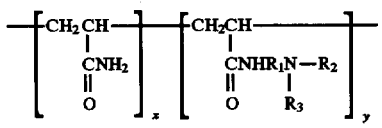

wherein
$R_1$ is $(CH_2)_{1-20}$;

$R_2$ and $R_3$ are independently selected from the group consisting of $CH_3$, $(CH_2)_{1-20}$—$CH_3$, phenyl or substituted phenyl groups;

and at least one $(CH_2)$ group in said $(CH_2)_{1-20}$ group and said $(CH_2)_{1-20}$—$CH_3$ group can be replaced by

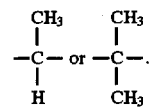

18. The method of claim 1 wherein said demulsified water is passed to a process for removing dissolved contaminant hydrocarbons from said demulsified water.

19. The method of claim 18 wherein said dissolved contaminant hydrocarbons comprise at least three aromatic-containing contaminants selected from the group consisting of benzene, toluene, ethyl benzene and xylene.

20. The method of claim 1 wherein said cationic polyacrylamide has a molecular weight greater than 1,000,000.

21. The method of claim 4 wherein said waste water further comprises inorganic solids in suspended form and said coagulation further comprises said inorganic solids.

22. The method of claim 21 wherein said oil-containing contaminants comprise a diesel fraction.

23. The method of claim 1 further comprising contacting said demulsified water with adsorbent particles.

24. The method of claim 23 wherein said adsorbent particles are selected from the group consisting of granular carbon, powdered carbon and polymeric resins.

25. The method of claim 23 wherein said adsorbent particles comprise a pyrolized microporous resinous polymer.

26. The method of claim 1 wherein said oil-in-water emulsion contains petroleum-derived oils having molecules containing at least 9 carbon atoms.

27. The method of claim 1 wherein the emulsified oil contained in said oil-in-water emulsion is reduced to less than about 15 ppmw of said demulsified water.

28. The method of claim 1 wherein said high polymer composition comprises Magnifloc 494C flocculent or Magnifloc 1594 flocculent.

29. A method for removing emulsified petroleum-derived oil from waste water, said method comprising:

mixing waste water containing emulsified oil with a high polymer composition comprising a cationic polyacrylamide and aluminum sulfate to form (1) a flocculation containing oil from said emulsified oil, and (2) at least a portion of demulsified water, where said flocculation is of a density greater than the density of the demulsified water, and separating said flocculation from said demulsified water.

30. The method defined in claim 29 wherein said cationic polyacrylamide has a molecular weight above 1,000,000.

31. The method defined in claim 29 wherein said waste water comprises about 0.5 to about 10 ppmw of said cationic polyacrylamide.

32. The method of claim 29 wherein said waste water comprises about 25 to about 100 ppmw of said emulsified oil.

33. The method of claim 29 wherein said aluminum sulfate and said high polymer composition of cationic polyacrylamide are mixed with said waste water in a weight ratio from about 500:1 to about 1:0.25, aluminum sulfate to high polymer composition.

34. The method of claim 29 wherein step (1) further comprises agitating said oil-in-water emulsion with said high polymer composition by mixing means selected from the group consisting of static mixers, impeller mixers, paddle mixers, and modifications thereof.

35. The method of claim 29 wherein said cationic polyacrylamide comprises the following structure:

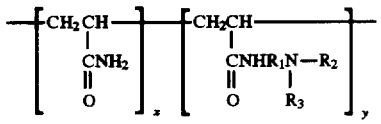

wherein $R_1$ is $(CH_2)_{1-20}$;

$R_2$ and $R_3$ are independently selected from the group consisting of $CH_3$, $(CH_2)_{1-20}$—$CH_3$, phenyl or substituted phenyl groups;

and at least one $(CH_2)$ group in said $(CH_2)_{1-20}$ group and said $(CH_2)_{1-20}$—$CH_3$ group can be replaced by

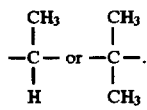

36. The method of claim 29 wherein said demulsified water is passed to a process for removing dissolved contaminant hydrocarbons from said demulsified water.

37. The method of claim 29 further comprising contacting said demulsified water with adsorbent particles.

38. The method of claim 29 wherein said oil-in-water emulsion contains petroleum-derived oils and/or greases having molecules containing at least 9 carbon atoms.

39. The method of claim 29 wherein said high polymer composition comprises Magnifloc 494C flocculent or Magnifloc 1594 flocculent.

40. A method for removing emulsified petroleum-derived oil from waste water, said method comprising:

mixing waste water containing emulsified oil and suspended inorganic solids with a high polymer composition comprising a cationic polyacrylamide having a molecular weight above 1,000,000 to form (1) a coagulation containing said inorganic solids and oil from said emulsified oil and (2) at least a portion of demulsified water, where said coagulation is of a density greater than the density of the demulsified water, and settling said coagulation in said waste water to separate said emulsified oil and said inorganic solids from said demulsified water.

41. The method of claim 40 wherein said waste water comprises about 0.5 to about 10 ppmw of said cationic polyacrylamide.

42. The method of claim 40 wherein said coagulation is separated from said demulsified water by separation means selected from the group consisting of a clarifier, a thickener, settling tank, pond, lagoon, and modifications thereof.

43. The method of claim 40 wherein said waste water comprises about 25 to about 100 ppmw of said emulsified oil.

44. The method of claim 40 wherein aluminum sulfate and said high polymer composition of cationic polyacrylamide are mixed with said waste water in a weight ratio from about 500:1 to about 1:0.25, aluminum sulfate to high polymer composition.

45. The method of claim 40 wherein step (1) further comprises agitating said oil-in-water emulsion with said high polymer composition by mixing means selected from the group consisting of static mixers, impeller mixers, paddle mixers, and modifications thereof.

46. The method of claim 40 wherein the turbidity of said waste water is greater than 5 Formazin Turbidity Units (FTU).

47. The method of claim 40 wherein said demulsified water contains less than 40 ppmw of said emulsified oil.

48. The method of claim 40 wherein said cationic polyacrylamide comprises the following structure:

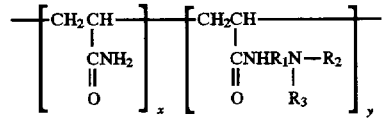

wherein $R_1$ is $(CH_2)_{1-20}$;

$R_2$ and $R_3$ are independently selected from the group consisting of $CH_3$, $(CH_2)_{1-20}$—$CH_3$, phenyl or substituted phenyl groups;

and at least one $(CH_2)$ group in said $(CH_2)_{1-20}$ group and said $(CH_2)_{1-20}$—$CH_3$ group can be replaced by

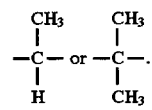

49. The method of claim 40 further comprising contacting said demulsified water with adsorbent particles.

50. The method of claim 40 wherein said oil-in-water emulsion contains petroleum-derived oils and/or greases having molecules containing at least 9 carbon atoms.

51. The method of claim 40 wherein said high polymer composition comprises Magnifloc 494C flocculent or Magnifloc 1594 flocculent.

52. The method of claim 40 wherein said emulsified oil comprises a diesel fraction.

53. A method for removing oil-containing contaminants from waste water by demulsifying an oil-in-water emulsion, said method comprising the following steps:

(1) contacting said waste water containing an oil-in-water emulsion with a high polymer composition consisting essentially of a cationic polyacrylamide to form a coagulation of oil-containing clusters and at least a portion of demulsified water, where said coagulation is of a density greater than the density of the demulsified water, and (2) settling said coagulation from said demulsified water, wherein said cationic polyacrylamide comprises the following structure:

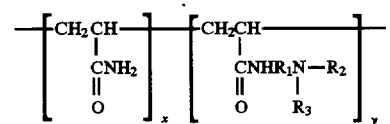

wherein $R_1$ is $(CH_2)_{1-20}$;

$R_2$ and $R_3$ are independently selected from the group consisting of $CH_3$, $(CH_2)_{1-20}$—$CH_3$, phenyl or substituted phenyl groups; and at least one $(CH_2)$ group in said $(CH_2)_{1-20}$ group and said $(CH_2)_{1-20}$—$CH_3$ group can be replaced by

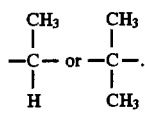

54. The method of claim 53 wherein the turbidity of said demulsified water is less than 20 FTU.

55. The method of claim 53 wherein said demulsified water contains less than 50 weight percent of said oil-containing contaminants contained in said waste water.

56. The method of claim 53 wherein said demulsified water contains less than 40 ppmw of said oil-containing contaminants.

57. A method for removing oil-containing contaminants from waste water by demulsifying an oil-in-water emulsion, said method comprising the following steps:

(1) mixing waste water containing emulsified oil with a high polymer composition comprising a cationic polyacrylamide and aluminum sulfate to form (1) a flocculation containing oil from said emulsified oil, and (2) at least a portion of demulsified water, where said flocculation is of a density greater than the density of the demulsified water, and (2) settling said coagulation from said demulsified water, wherein the polymer portion of said high polymer composition consists essentially of a cationic polyacrylamide having the following structure:

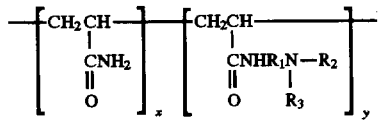

wherein $R_1$ is $(CH_2)_{1-20}$;

$R_2$ and $R_3$ are independently selected from the group consisting of $CH_3$, $(CH_2)_{1-20}$—$CH_3$, phenyl or substituted phenyl groups; and at least one $(CH_2)$ group in said $(CH_2)_{1-20}$ group and said $(CH_2)_{1-20}$—$CH_3$ group can be replaced by

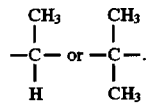

58. The method of claim 57 wherein the turbidity of said demulsified water is less than 20 FTU.

59. The method of claim 57 wherein said demulsified water contains less than 50 weight percent of said oil-containing contaminants contained in said waste water.

60. The method of claim 57 wherein said demulsified water contains less than 40 ppmw of said oil-containing contaminants.

61. A method for removing oil-containing contaminants from waste water by demulsifying an oil-in-water emulsion, said method comprising the following steps:

(1) contacting said waste water containing an oil-in-water emulsion with a cationic polyacrylamide having the following structure:

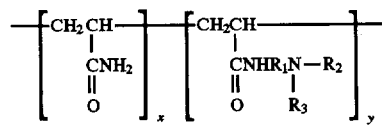

wherein $R_1$ is $(CH_2)_{1-20}$;

$R_2$ and $R_3$ are independently selected from the group consisting of $CH_3$, $(CH_2)_{1-20}$—$CH_3$, phenyl or substituted phenyl groups; and at least one $(CH_2)$ group in said $(CH_2)_{1-20}$ group and said $(CH_2)_{1-20}$—$CH_3$ group can be replaced by

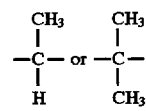

to form a coagulation of oil-containing clusters and at least a portion of demulsified water, where said coagulation is of a density greater than the density of the demulsified water, and (2) settling said coagulation from said demulsified water.

62. The method of claim 61 wherein said cationic polyacrylamide comprises Magnifloc 494C flocculent or Magnifloc 1594 flocculent.

63. The method of claim 61 wherein the turbidity of said demulsified water is less than 20 FTU.

64. The method of claim 61 wherein said demulsified water contains less than 50 weight percent of said oil-containing contaminants contained in said waste water.

65. The method of claim 61 wherein said demulsified water contains less than 40 ppmw of said oil-containing contaminants.

* * * * *

UNITED STATES PATENT AND TRADEMARK OFFICE
CERTIFICATE OF CORRECTION

PATENT NO. : 5,730,882
DATED : March 24, 1998
INVENTOR(S) : Darrell L. Gallup and Danilo M. Capampangan It is certified that error appears in the above-indentified patent and that said Letters Patent is hereby corrected as shown below:

Claim 1, column 9, line 7, delete the word "setting" and replace with -- settling --.

Signed and Sealed this

Eighteenth Day of August, 1998

Attest:

BRUCE LEHMAN

*Attesting Officer*         *Commissioner of Patents and Trademarks*